(12) United States Patent
Miller et al.

(10) Patent No.: US 11,156,475 B2
(45) Date of Patent: Oct. 26, 2021

(54) METHOD AND SYSTEM FOR PACKING AN ELECTRONIC FLIGHT BAG

(71) Applicant: Foreflight LLC, Houston, TX (US)

(72) Inventors: Jason Miller, Austin, TX (US); Christopher Tyson Weihs, Houston, TX (US); William Bryce Gestrich, Pittsburgh, PA (US); Raymond Aaron Farnham, Houston, TX (US)

(73) Assignee: Foreflight LLC, Houston, TX (US)

( * ) Notice: Subject to any disclaimer, the term of this patent is extended or adjusted under 35 U.S.C. 154(b) by 333 days.

(21) Appl. No.: 16/168,422

(22) Filed: Oct. 23, 2018

(65) Prior Publication Data

US 2020/0124441 A1 Apr. 23, 2020

(51) Int. Cl.
| | |
|---|---|
| *G01C 23/00* | (2006.01) |
| *G06F 3/147* | (2006.01) |
| *G05D 1/10* | (2006.01) |
| *G05D 1/00* | (2006.01) |
| *G05D 1/02* | (2020.01) |

(52) U.S. Cl.
CPC ........... *G01C 23/005* (2013.01); *G06F 3/147* (2013.01); *G05D 1/0077* (2013.01); *G05D 1/0202* (2013.01); *G05D 1/101* (2013.01); *G09G 2380/12* (2013.01)

(58) Field of Classification Search
None
See application file for complete search history.

(56) References Cited

U.S. PATENT DOCUMENTS

| | | | |
|---|---|---|---|
| 7,940,259 B2 * | 5/2011 | Wright | G08G 5/0095 |
| | | | 345/419 |
| 2012/0143405 A1 * | 6/2012 | Cabos | G07C 5/008 |
| | | | 701/3 |
| 2015/0142224 A1 * | 5/2015 | Latorre-Costa | G01C 23/00 |
| | | | 701/14 |

OTHER PUBLICATIONS

Garmin International Inc., "Garmin Pilot™" App for iPad® and iPhone® Devices; <https://buy.garmin.com/en-US/US/p/115856>; Accessed Oct. 23, 2018 (6 pages).

(Continued)

*Primary Examiner* — Angela Y Ortiz
*Assistant Examiner* — Garrett F Evans
(74) *Attorney, Agent, or Firm* — Ferguson Braswell Fraser Kubasta PC

(57) ABSTRACT

A method for packing an electronic flight bag (EFB) involves obtaining a route, determining a buffer zone surrounding the route, identifying aeronautical content to be downloaded that is at least partially located in the buffer zone, and downloading the identified aeronautical content from a remote aeronautical content repository to the EFB device. The method further involves selecting, from the downloaded aeronautical content, at least one aeronautical chart, and displaying the route and the buffer zone in the at least one aeronautical chart.

20 Claims, 9 Drawing Sheets

(56) References Cited

OTHER PUBLICATIONS

Jeppesen, "Jeppesen FliteDeck Pro 4.0"; Mobile Airline Charting Application; <http://ww1.jeppesen.com/aviation/products/flitedeck-pro/index.jsp>; Accessed Oct. 23, 2018 (4 pages).

ForeFlight LLC, "ForeFlight Mobile 6.1 Introduces Pack, Now Available on the App Store"; <https://blog.foreflight.com/2014/06/02/foreflight-mobile-6-1-introducing-pack/?_ga=2.253784783.695619497.1540302040-445898421.1540302040>; Blog Posted Jun. 2, 2014 (4 pages).

ForeFlight LLC, "Automatically Pack Weather and NOTAMs in ForeFlight Mobile version 6.6.1"; <https://blog.foreflight.com/2015/01/13/automatically-pack-weather-and-notams-in-foreflight-mobile-version-6-6-1/?_ga=2.24108157.695619497.1540302040-445898421.1540302040>; Blog Posted Jan. 13, 2015 (2 pages).

* cited by examiner

METHOD AND SYSTEM FOR PACKING AN ELECTRONIC FLIGHT BAG

BACKGROUND

Pilots are required to be familiar with all pertinent aeronautical data associated with a flight prior to departure. The type of data to be collected depends on the pilot's route of flight and type of operation performed. Electronic flight bags (EFBs) offer pilots aeronautical content that may be used to satisfy these requirements. Storage capacity requirements for downloading all available aeronautical content are significant and may exceed the capacity of the mobile device on which the EFB is hosted.

SUMMARY

In general, in one aspect, one or more embodiments relate to a method for packing an electronic flight bag (EFB), the method comprising: obtaining a route; determining a buffer zone surrounding the route; identifying aeronautical content to be downloaded that is at least partially located in the buffer zone; downloading the identified aeronautical content from a remote aeronautical content repository to the EFB device; selecting, from the downloaded aeronautical content, at least one aeronautical chart; and displaying the route and the buffer zone in the at least one aeronautical chart.

In general, in one aspect, one or more embodiments relate to a system for packing an electronic flight bag (EFB), the system comprising: a route repository; a local aeronautical content repository; a display; and an EFB packing engine configured to: obtain a route from the route repository; determine a buffer zone surrounding the route; identify aeronautical content to be downloaded that is at least partially located in the buffer zone; downloading the identified aeronautical content from a remote aeronautical content repository to the local aeronautical content repository of the EFB device; selecting, from the downloaded aeronautical content, at least one aeronautical chart; and displaying, in the display, the route and the buffer zone in the at least one aeronautical chart.

In general, in one aspect, one or more embodiments relate to a non-transitory computer readable medium including computer readable program code for causing a computer system to: obtain a route; determine a buffer zone surrounding the route; identify aeronautical content to be downloaded that is at least partially located in the buffer zone; download the identified aeronautical content from a remote aeronautical content repository to the EFB device; select, from the downloaded aeronautical content, at least one aeronautical chart; and display the route and the buffer zone in the at least one aeronautical chart.

Other aspects of the disclosed invention will be apparent from the following description and the appended claims.

DETAILED DESCRIPTION

Figure 1:
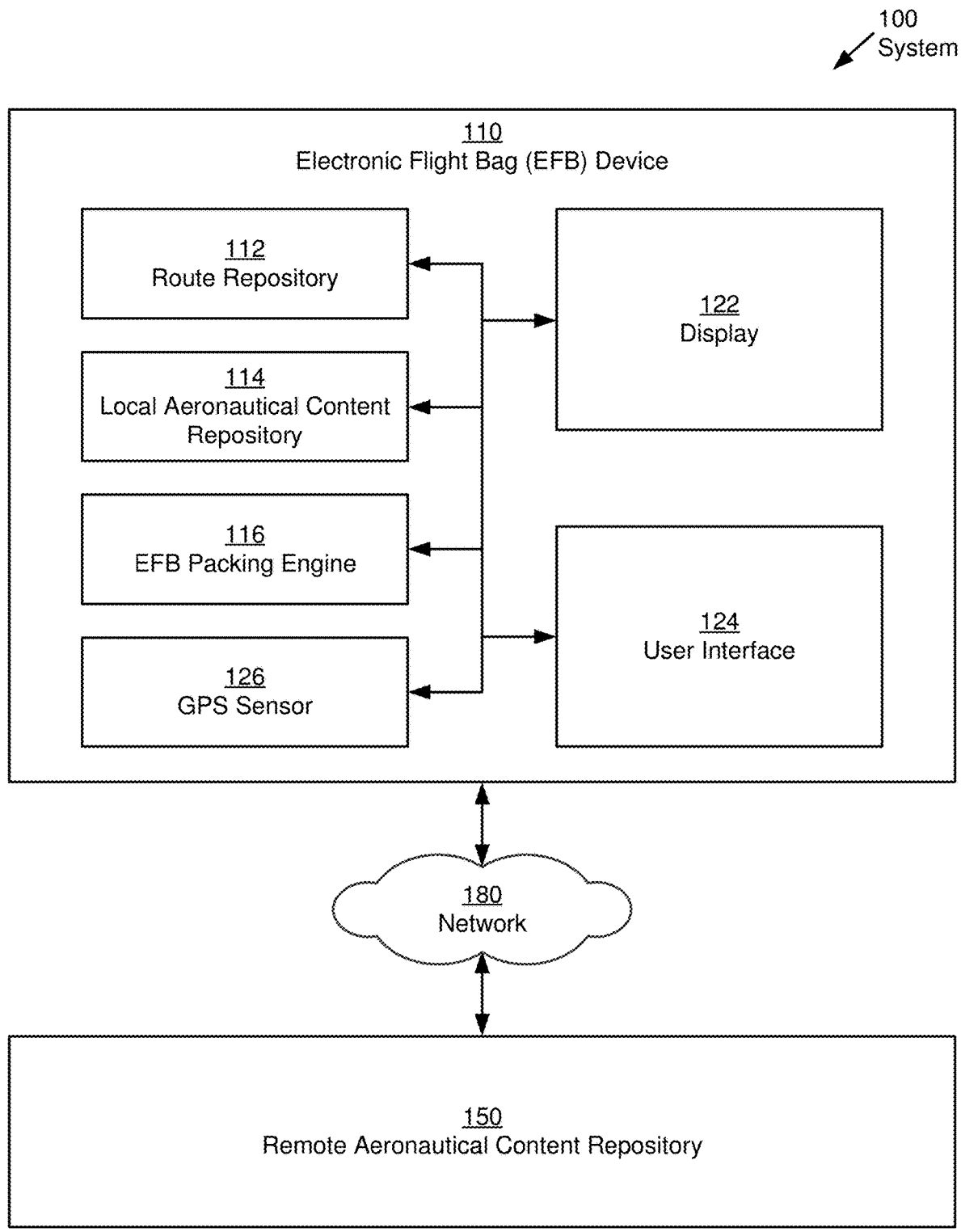
FIG. 1 shows a block diagram of a system for packing an electronic flight bag (EFB), in accordance with one or more embodiments of the invention.

Specific embodiments of the disclosed technology will now be described in detail with reference to the accompanying figures. Like elements in the various figures may be denoted by like reference numerals and/or like names for consistency.

The following detailed description is merely exemplary in nature, and is not intended to limit the disclosed technology or the application and uses of the disclosed technology. Furthermore, there is no intention to be bound by any expressed or implied theory presented in the preceding technical field, background, brief summary or the following detailed description.

In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the invention enable the packing of electronic flight bags (EFBs) used by flight crews to access relevant aeronautical content prior to and during flights. Pilots are required to be familiar with all pertinent aeronautical data associated with a flight prior to departure. The type of data to be collected depends on the pilot's route of flight and type of operation performed. Electronic flight bags (EFBs) offer pilots aeronautical content that may be used to satisfy these requirements. Storage capacity requirements for downloading all available aeronautical content are significant and may exceed the capacity of the mobile device on which the EFB is hosted. Thus, aeronautical content is selectively packed to reduce storage capacity requirements while ensuring that current versions of all required aeronautical content are available in the EFB. The required aeronautical content is determined based on routes. One method for selecting such data is to select a buffer zone along the route. The buffer zone is an area that extends a defined distance perpendicular to the route along the route. Data about locations within the buffer zone and route is automatically included in the EFB for the route, while data about locations external to the buffer zone and route are excluded from being automatically included in the EFB. In one or more embodiments, the buffer zone is established in at least two dimensions, i.e., the buffer zone extends to at least the left and the right of the route. The buffer zone may further be established in additional dimensions: The buffer zone may be established to include an altitude component, i.e., a vertical buffer. Time may be an additional dimension to be considered for the buffer zone. One or more embodiments is directed to a user interface that displays the route and the buffer zone along the route on a map. Thus, by merely viewing the map, a user is able to identify the data packed.

Turning to FIG. 1, a block diagram of a system for packing an electronic flight bag (EFB), in accordance with one or more embodiments of the invention, is shown. The system (100) is based on an EFB device (110) and may include a route repository (112), a local aeronautical content repository (114), an EFB packing engine (116), a display (122), a user interface (124), and may further include a GPS sensor (126). The EFB device (110) may be communicatively connected to a remote aeronautical content repository (150) via a network (180). Each of these components is subsequently described.

The EFB device (110) may be a portable computing device, for example, a tablet computer, a smartphone, or a laptop. Exemplary configurations of computing devices in accordance with one or more embodiments of the invention are described below, with reference to FIGS. 6A and 6B. Alternatively, a permanently installed EFB device may be used instead of the portable computing device, without departing from the invention. For example, in one or more embodiments of the invention, the EFB device may be installed in a cockpit of an airplane or in a dashboard of a vehicle. The EFB device (110), in accordance with one or more embodiments of the invention, is configured to execute a set of machine-readable instructions (stored on a computer-readable medium) which, when executed by the EFB device (110), perform one or more of the steps described in the flowcharts of FIGS. 2A, 2B and 3. The performed steps may make aeronautical content that is required or beneficial for conducting a flight available on the EFB device (110). The steps described in the flowcharts of FIGS. 2A, 2B and 3 may be performed while the EFB device (110) is connected to the remote aeronautical content repository (150) via the network (180). This may be prior to conducting a flight, whereas during the flight, the connection to the remote aeronautical content repository may not be available.

The route repository (112) may store routes. A route may be a flight path from a departure airport to a destination airport and may include intermediate points such as navigations fixes, additional airports, etc. A more detailed description of routes is provided below with reference to FIG. 4A. A route may be a route that a pilot is intending to use, or a previously used route. The route repository (112) may further include other information to further characterize the stored routes. For example, it may be specified whether a route is to be used under visual flight rules (VFR) or under instrument flight rules (IFR), a vertical profile (including altitudes and/or geo-points where altitudes are changed), distance, fuel burn, aircraft of vehicle speeds and/or other performance data, estimated time of departure (thus defining a point in time when the aeronautical content is required to be valid), estimated time en-route, estimated time of arrival, delays or pauses in the route, special procedures or maneuvers in the route, etc. Accordingly, a route in accordance with one embodiment of the invention has geographic and non-geographic characteristics. In one embodiment of the invention, a route is stored as a flight plan. The flight plan may specify additional details such as radio frequencies to be used, available navigational aids, en-route times, arrival times, departure times, etc.

The local aeronautical content repository (114) may store the aeronautical content downloaded from the remote aeronautical content repository (150) as described with reference to FIGS. 2A, 2B and 3. The stored aeronautical content may include any type of content that may be required or beneficial when conducting a flight as specified by a route. The aeronautical content stored in the local aeronautical content repository (114) may include, for example, charts (such as visual flight rules (VFR) sectionals, VFR and instrument flight rules (IFR) en-route charts, airport diagrams, terminal area charts, world aeronautical charts), notifications and forecasts (such as meteorological terminal aviation routine (METAR) weather reports, terminal aerodrome forecasts (TAFs), significant meteorological information (SIGMETs), airmen's meteorological information (AIRMETs) temporary flight restrictions (TFRs), notices to airmen (NOTAMs)), airport, navigation, communication facility information, and/or fixed base operator (FBO) information, fuel availability and prices, weather databases, winds aloft databases, turbulence and icing databases and any other data such as user submitted comments, basic airport and navigation databases, business directories, user documents, etc., that may be necessary or beneficial for conducting a flight.

Some of the aeronautical content may be static or pseudo-static (i.e., not changing or infrequently changing), whereas other aeronautical content may be dynamic (i.e., changing occasionally or frequently).

In one or more embodiments of the invention, the local aeronautical content repository (114) does include the aeronautical content that is related to one or more routes for which the EFB is packed, but not necessarily other aeronautical content that is not related to the one or more routes. In other words, the local aeronautical content repository (114), in accordance with one or more embodiments of the invention, contains selected aeronautical content to ensure that a flight crew has access to all required or useful information pertinent to the one or more routes, while reducing storage capacity requirements by not storing unrelated aeronautical content. Further, some of the aeronautical content may be mandatory, whereas other content may be optional.

The local aeronautical content repository (114) may be structured in any form suitable for storing aeronautical content. The local aeronautical content repository may be located on a hard disk drive, on a flash drive or on any other non-volatile storage medium. Alternatively, parts of the local aeronautical content repository or the entire local aeronautical content repository may be stored in volatile memory.

The EFB packing engine (116) may include software instructions that enable the packing of an EFB. In one or more embodiments of the invention, the software instructions implement one or more of the steps described in the flowcharts of FIGS. 2A, 2B and 3 to selectively download aeronautical content from the remote aeronautical content repository (150) to the local aeronautical content repository (112). The EFB packing engine (116) may perform these steps for any route that is stored in the EFB device (110), including newly generated routes and archived routes.

The EFB device (110) may communicate with the remote content repository (150) via the network (180). The remote aeronautical content repository (150), in accordance with one or more embodiments of the invention, is the resource from which aeronautical content is downloaded to the local aeronautical content repository (114). The remote content repository may store comprehensive aeronautical content, beyond the aeronautical content stored in the local aeronautical content repository (114). For example, the remote aeronautical content repository may store a complete or near-complete set of aeronautical content for an entire geographic region, e.g. North America, whereas the local aeronautical content repository (114) may only store the aeronautical content associated with one or more routes, within that geographic region. In one or more embodiments of the invention, the aeronautical content in the remote aeronautical content repository may be static (or pseudo-static), i.e., with updates occurring infrequently and/or dynamic, with occasional updates (e.g., maps being updated at fixed or irregular intervals), or frequently (e.g. weather information). Accordingly, depending on the aeronautical content that is being used, the remote aeronautical content repository (150) may be periodically accessed to update previously downloaded aeronautical content.

The remote aeronautical content repository (150) may be structured in any form suitable for storing aeronautical content. In one or more embodiments of the invention, the remote aeronautical content repository is cloud-based and may include multiple data sources. For example, map content may be provided for download by a map service provider, weather data may be provided by a government organization such as the National Oceanic and Atmospheric Administration (NOAA), NOTAMs may be provided by the Federal Aviation Administration (FAA), etc. Accordingly, the remote aeronautical content repository (150) may include a set of heterogeneous information sources which, when taken together, provide the aeronautical content for a geographic region.

Aeronautical content in the remote aeronautical content repository (150) may be accompanied by metadata providing a characterization of the associated aeronautical content. For example, a chart that covers the state of Texas would include a country/region code such as "US-TX". This country/region code may be associated with a polygon formed by coordinates (e.g., latitude/longitude coordinates) that represent the coverage of the chart. Accordingly, available coordinates (e.g., coordinates associated with a route) can be checked against the polygon to determine whether these coordinates are within the polygon. If so, the country/region code may be used to identify the correct aeronautical content for download. In one embodiment of the invention, a geodatabase such as SpatiaLite is used to store this geographic information.

Figure 6A:
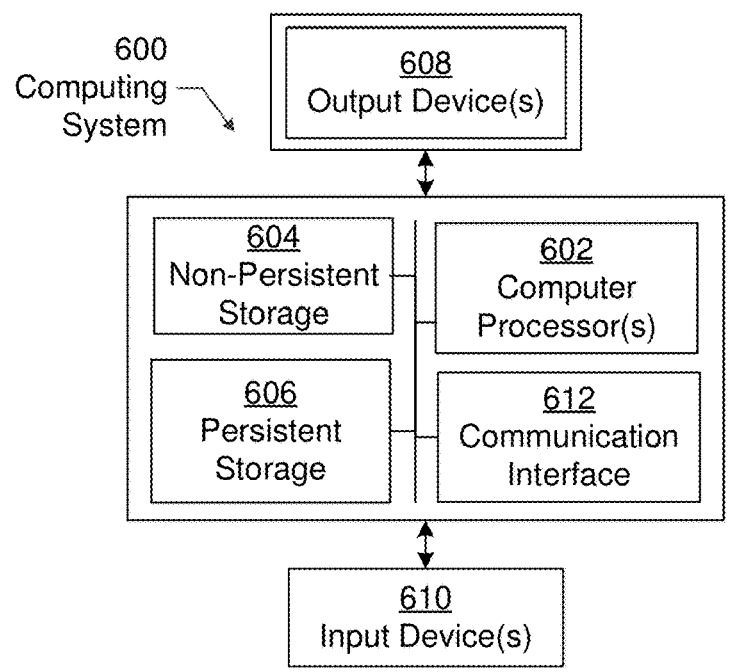
FIGS. 6A and 6B show computing systems in accordance with one or more embodiments of the invention.
Figure 6B:
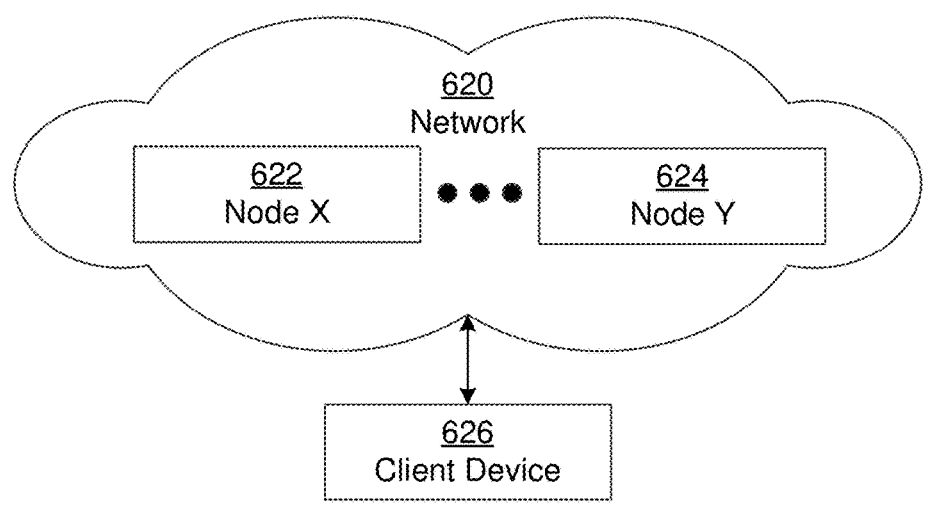

The network (180), connecting the EFB device (110) and the remote aeronautical content repository (150) may be any type of network, similar to the network described in FIGS. 6A and 6B. In one or more embodiments of the invention, the network (180) is not continuously available, thus necessitating the download of aeronautical content from the remote aeronautical content repository (150) to the local aeronautical content repository (114) for offline availability.

Once the aeronautical content has been obtained, the EFB device (110) may be used to execute an integrated flight application (not shown) configured to serve an aircraft crew, e.g., pilots, co-pilots, etc. In the integrated flight application, any downloaded aeronautical content may be visualized as desired or needed by the aircraft crew during the various phases of a flight. The aeronautical content such as maps, may be set up as layers and/or overlays that give the flight crew the flexibility to review the most relevant or desired features, while hiding currently non-relevant features in a situation-specific manner. For example, based on an initial zoom level used to show a larger geographic area, only an airport symbol may be shown, and upon zooming in, airport diagrams, complete with runways, taxi labels, and fixed-based operator (FBO) locations may appear.

The integrated flight application may be used to gather and view information during a flight, but also to plan flights and/or to select routes. The selected routes may then be displayed on maps. Maps provided by the integrated flight application may be moving maps for air and/or ground operations that include an own-ship display indicting the current position of the aircraft on the moving map as the flight is progressing.

In one or more embodiments of the invention, the aeronautical content used by the integrated flight application is obtained from the local aeronautical content repository.

Users may interact with the EFB device (110) via the display (122) and via the user interface (124). The display (122) of the EFB device (110) may be a screen, such as a liquid crystal display (LCD), light emitting diode (LED) or organic LED (OLED) screen or any other type of display that supports visual content to be shown to a user. Specialized display technologies or accessories may further be used, e.g., screens that are customized for nighttime use. The display may be used as the output interface to a user (e.g. a pilot) and may display various layers of maps, additional symbolic or text content, etc. The display (122) may be used to show packed aeronautical content in various forms. For example, an overview may be displayed, showing routes for which a packing was performed (or not). Similarly, a packed route may be displayed in a map, the aeronautical content that was packed for a route may be shown, etc., as subsequently described in detail.

The user interface (124) may enable a user to control the EFB device (110). The user interface, in accordance with one or more embodiments includes a keyboard. The keyboard may be a touch pad, e.g., implemented as a touch screen keyboard that may be superimposed on the display (122). Alternatively or additionally, other user input interfaces such as speech recognition may be provided. The user interface may thus enable a user to initiate and control the packing for routes as subsequently described in detail.

The display (122) and the user interface (124) may be used by the flight crew to select, establish and/or configure routes for which the EFB may be packed, e.g., prior to a flight. Further, the display and the user interface may also be used inflight, when the EFB device provides the services of the integrated flight application.

In one embodiment of the invention, the EFB device is equipped with a GPS sensor (126). The GPS sensor may provide location information to the EFB device (110). The location information may be used for the purpose of defining a route (e.g., by accepting the current location provided by the GPS sensor as the departure airport), but also to update the current location on a displayed map during a flight. The GPS sensor may be a sensor built into the EFB device (110) or may be an external sensor that may be installed on the aircraft being used.

While FIG. 1 shows a configuration of components, other configurations may be used without departing from the scope of the invention. For example, various components may be combined to create a single component. As another example, the functionality performed by a single component may be performed by two or more components. Accordingly, for at least the above-recited reasons, embodiments of the disclosed invention should not be considered limited to the specific arrangements of components and/or elements shown in FIG. 1.

Figure 2A:
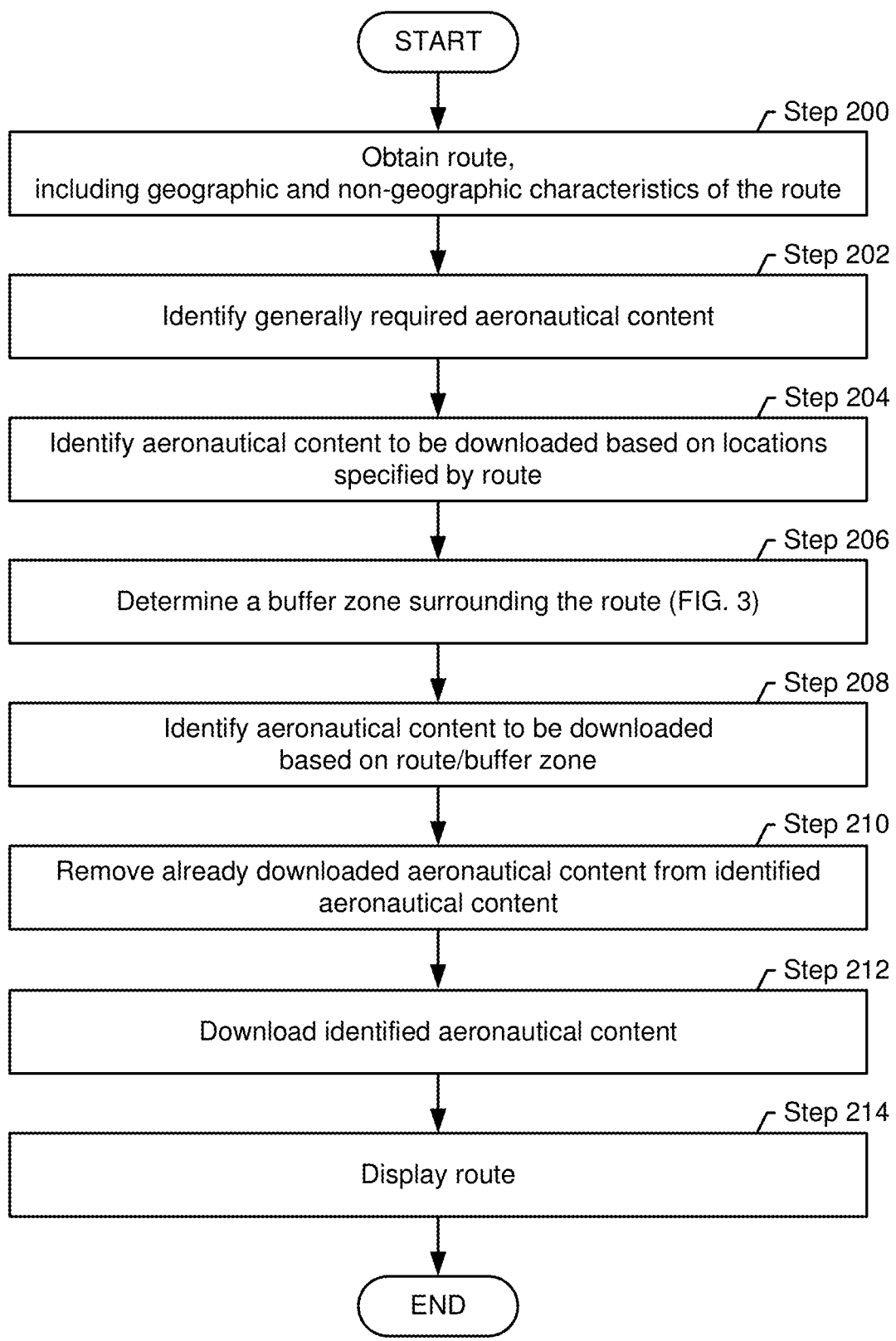
FIG. 2A shows a flowchart describing a method for packing an EFB for a route, in accordance with one or more embodiments of the invention.
Figure 2B:
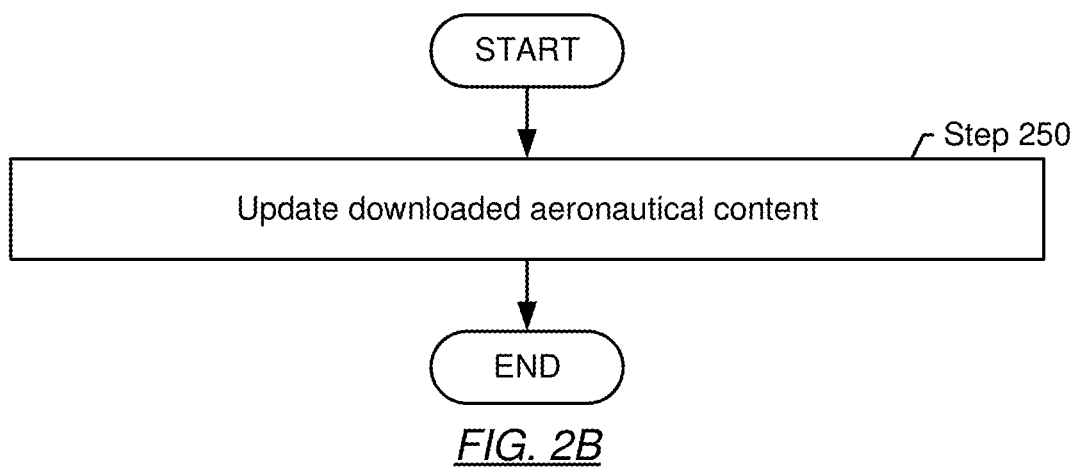
FIG. 2B shows a flowchart describing a method for updating a packed EFB, in accordance with one or more embodiments of the invention.
Figure 3:
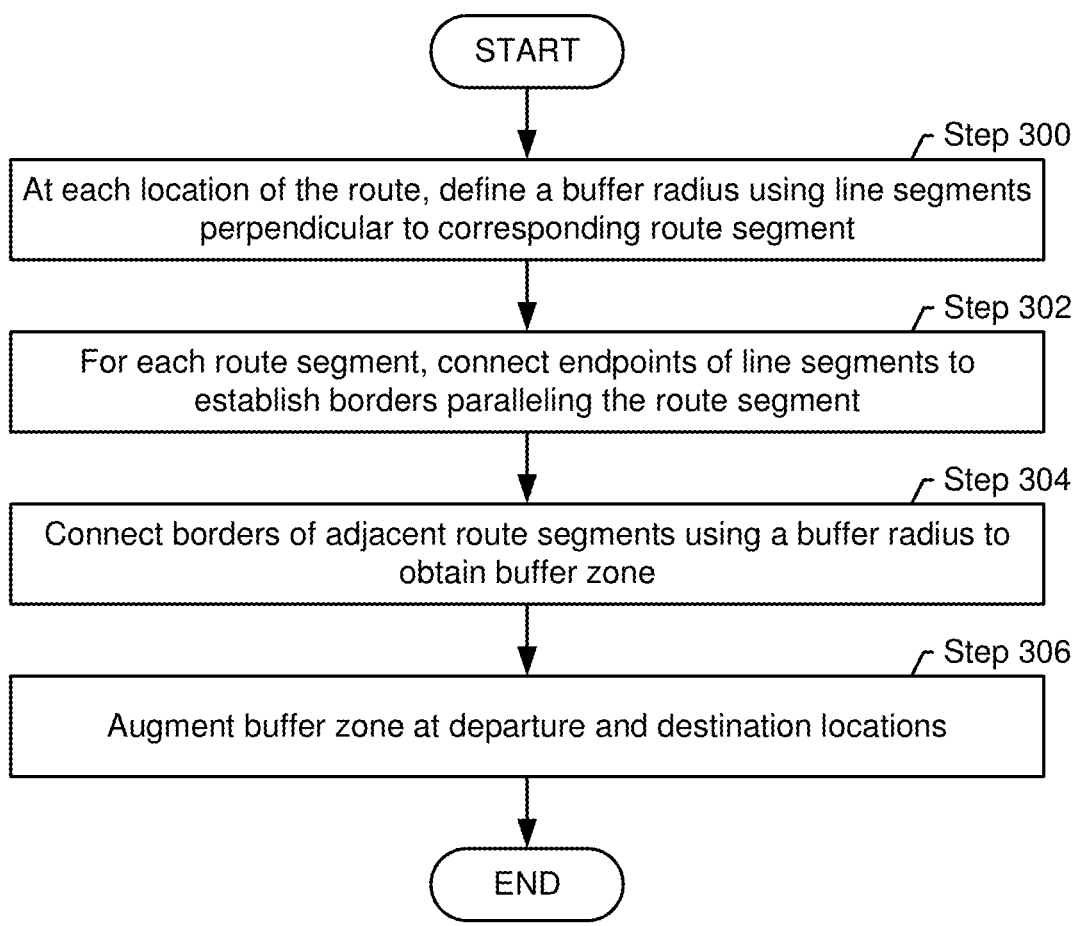
FIG. 3 shows a flowchart describing a method for determining a buffer zone for a route, in accordance with one or more embodiments of the invention.

FIGS. 2A, 2B and 3 show flowcharts in accordance with one or more embodiments of the invention. While the various steps in these flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2A, 2B and 3 may be performed in parallel with any other steps shown in FIGS. 2A, 2B and 3, without departing from the invention.

FIG. 2A describes a method for packing an electronic flight bag (EFB), in accordance with one or more embodiments of the invention. The method may be executed when a route is available in the route repository. The execution of the method may be manually invoked by a user (e.g., by receiving a user request for the packing of the EFB for one or more routes) or automatically, when a route becomes available. The EFB device may include an on-screen control that toggles an "Enable Auto-Check" on and off. If "Enable Auto-Check" is on, packing may automatically start when a route to be packed becomes available. If "Enable Auto-Check" is off, packing may be manually initiated, e.g., by tapping an icon. The method of FIG. 2A may be performed for newly entered routes, for existing routes for which packing was manually performed, and for routes that have been edited, thus requiring repacking.

In Step 200, a route is obtained. The obtained route may be a route that is entered by a user, e.g., a flight crew member, or it may be a route that is stored in the route repository (such as a previously used route). The obtained route, in one or more embodiments of the invention, includes geographic characteristics such as locations that establish end points of route segments. These locations may be provided in any kind of geographic reference frame. The locations may be connected using straight or curved line segments. A route segment may, thus, be formed by two locations and the line segment in between. Multiple consecutive route segments may be combined to form a route. A more detailed description of routes and elements of routes is provided below with reference to FIG. 4A. Obtaining the route may further include obtaining non-geographic characteristics of the route. These non-geographic characteristics may affect the subsequent choice of the aeronautical content. For example, a route to be used under visual flight rules (VFR) may require a sectional aeronautical chart, whereas a route to be used under instrument flight rules (IFR) may require an IFR en-route aeronautical chart.

In Step 202, mandatory aeronautical content is identified. Mandatory aeronautical content may include content that is required regardless of the nature of the route. This may include, for example, aeronautical content that is mandatorily required by the Federal Aviation Administration (FAA), content that is specified by an airline, or that is required for any other reason, for example content that is generally required for the operation of an integrated flight application to provide certain functionalities such as map overlays. This may include, for example, weather databases, winds aloft databases, turbulence and/or icing databases. Other mandatory aeronautical content may include user documents, basic airport and navigation databases, business directories, etc.

In Step 204, content to be downloaded based on locations specified by the route is identified. A route may specify multiple locations including at least a departure airport and a destination airport. For one or more of the locations of the route, aeronautical content that is associated with these locations may be identified. For example, FBO information including fuel availability and pricing may be obtained for the airports.

In Step 206, a buffer zone, surrounding the route, is determined. In one or more embodiments of the invention, the buffer zone is used to provide a margin, ensuring that for deviations from the route, within certain limits, aeronautical content is still provided. This may be important to accommodate deviations from the ideal route due to winds, navigational errors, etc. Further, this may also be important to accommodate adverse events (such as a thunderstorm cell that needs to be circumnavigated) to provide additional information in the vicinity of airports, etc. Details regarding the generation of a buffer zone are provided below in the flowchart of FIG. 3, and an illustration of the steps involved in the generation of the buffer zone is provided in FIGS. 4A-4E. The buffer zone may be established in any coordinate system, e.g., using latitude/longitude coordinates. In one or more embodiments of the invention, the buffer zone is higher-dimensional. In other words, the buffer zone may have more than two dimensions. A third dimension may be established based on specified altitudes along the route. The buffer zone may thus have a boundary or border that is substantially parallel to an altitude profile of the route. An upper and a lower boundary may be established. This vertical buffer may be beneficial for identifying relevant wind, icing and or turbulence data, etc.

Further, time may form another dimension of the buffer zone. Specifically, the location at any time during the flight may be calculated based on an estimated departure time and the speed along the route. The buffer zone may thus be delimited based on an anticipated progression of a flight using the route. Specifically, for each location of the series of locations along the route, aeronautical content may be obtained based on the time that the plane is expected to be at the location. Accordingly, aeronautical content may be downloaded in a location and time-specific manner. Consider, for example, a two-hour flight with a 6 PM departure time. In this scenario, using weather data for 6 PM along the entire route may be suboptimal. For example, a thunderstorm predicted for the a location on the path to the destination at 8 PM may not show in the weather data for 6 PM.

In Step 208, aeronautical content to be downloaded is identified, based on geographic constraints, including the route and the buffer zone surrounding the route, and based on non-geographic constraints. More specifically, any aeronautical content that has a geographic overlap with the buffer zone is identified. The detection of geographic overlap may be performed based on the coordinates of the buffer zone. The coordinates may be compared to the geographic coverage of the available aeronautical content to detect geographic overlap.

Consider, for example, a flight that is conducted in the state of New York. The route is entirely in the state of New York, and accordingly, the New York VFR sectional chart is selected as aeronautical content. However, some of the route segments are in a geographic region that is covered by the Montreal VFR sectional chart, and accordingly the Montreal VFR sectional chart is selected as aeronautical content as well. Any other type of chart-like aeronautical content may be selected in a similar manner.

More specifically, aeronautical content may be selected based on metadata that accompanies the aeronautical content stored in the remote aeronautical content repository. The metadata that accompanies the chart establish a polygon using coordinates (e.g., latitude/longitude) thus describing the coverage of the chart.

The geometry of the buffer zone (described using, e.g., latitude/longitude coordinates) may be compared against these polygons that describe the coverage areas of the available aeronautical content such as charts. An aeronautical content may be considered for downloading if overlap between the buffer zone and the polygon is found. Each available content may be labeled with an identifier (e.g., a country/region code), and the identifier may, thus, later be used to locate the aeronautical content to be downloaded.

Analogous to the above-described selection of charts, any other aeronautical content that is available in the remote aeronautical content repository may be selected based on geographic overlap. Identified aeronautical content may include, but is not limited to, charts, detailed airport information including weather reports, notices and restrictions, etc.

Further, aeronautical content to be downloaded may be identified based on the non-geographic constraints. In the above example, New York and Montreal VFR sectional charts are selected, whereas no IFR en-route aeronautical charts are selected because the route is to be flown under visual flight rules. Further, based on the type of aircraft to be used, fuel prices for different fuels may be download (e.g., Jet-A vs. 100LL).

In Step 210, previously downloaded aeronautical content is removed from the identified aeronautical content to be downloaded to avoid redundant downloads. A version check may be performed to determine the version of the aeronautical content in the local aeronautical content repository, and the version of the aeronautical content to be downloaded from the remote aeronautical content repository. If the version in the remote aeronautical content repository is newer than the version in the local aeronautical content repository, the aeronautical content may still be considered as aeronautical content to be downloaded.

In Step 212, the identified aeronautical content is downloaded. Aeronautical content to be downloaded may be located using the identifier obtained in Step 208. The download may occur automatically, or after a review by the user. The date and time of the flight to be conducted may be considered when performing the download. Aeronautical content that is already available and that is known to be valid by the date/time of the flight may be immediately downloaded. In contrast, aeronautical content that is not yet available, e.g., weather data, new sectional charts that are about to be released, etc., may be scheduled for future downloading. The review may allow the user to deselect aeronautical content and/or add additional aeronautical content for download, as desired. If disk space is insufficient, the download may be suspended, and the user may be notified.

In Step 214, the route, obtained in Step 200, is displayed. The route may be displayed in the integrated flight application, for example when a flight is performed, or prior to a flight to confirm the packing status of the route. The route may be displayed using one of the aeronautical charts included in the downloaded aeronautical content. The route may be shown as a line from a departure airport to a destination airport, including possible intermediate locations. Further, the buffer zone may be shown, enabling a user to assess the aeronautical content that was downloaded. The buffer zone may be shown as an outline surrounding the route and/or as a shaded region surrounding the route. The geometry of the buffer zone is governed by the result of executing Step 206. An example is provided below, with reference to FIG. 5B. As described above, the buffer zone represents the area for which data to be packed is gathered. The buffer zone when superimposed on a map, thus, provides a user with an easy-to-interpret tool for assessing the scope of the packing for a route.

Turning to FIG. 2B, a method for updating an EFB, in accordance with one or more embodiments of the invention, is shown. As previously pointed out, aeronautical content may change over time. For example, a new sectional chart may become available, a weather forecast may change, a new AIRMET or NOTAM may become available a new TFR may be issued, fuel prices may change etc. These changes may occur at different frequencies ranging from infrequently (multi-month time resolution—e.g. charts) to frequently (minute time resolution—e.g., weather, NOTAMS, etc.). Accordingly, to maintain accurate aeronautical content for a route, an updating of the EFB may be necessary.

In Step 250, the aeronautical content is updated. The updating may be performed as follows. A persistent list of aeronautical content available for download may be maintained. Initially, such as when the application is installed on the EFB device, a list documenting aeronautical content may be obtained. For example, the list may be download from a remote server. The list may be obtained, for example, in a setup or configuration phase of the application. The list may then be stored on the EFB device, along with a timestamp (or another type of version indicator or identifier) associated with the list. Subsequently, the remote server may be periodically (e.g., every 30 minutes) queried for an updated list. If the list available on the remote server has a timestamp that distinguishes the list from the previously downloaded list, the list may, again, be downloaded from the remote server. If the list on the remote server does not have a different time stamp, no download may be performed, and the previously downloaded list may be considered up-to-date.

When an updated list is downloaded, the packed route(s) may be re-analyzed to determine whether outdated aeronautical content should be replaced by current aeronautical content. If so, the user may be notified (an alert or indicator may be provided), letting the user know that a re-packing is necessary. The user may then initiate a download of the current aeronautical content required for the route(s). Alternatively, the download may be automatically performed without user interaction. While the aeronautical content may be downloaded from different sources, the download may be substantially similar, regardless of the source. The described updating may be particularly suitable for infrequently updated aeronautical content.

An alternative method may be used for updating aeronautical content that changes more frequently. A polling approach may be used to update such aeronautical content, i.e., the source of the download may be directly contacted to obtain aeronautical content, without prior consultation of a list. Assume, for example, that a route includes airport 1, airport 2, and airport 3. The server(s) with aeronautical content for airports 1, 2, and 3 may thus be contacted. If the server(s) has current aeronautical content, the aeronautical content will be returned by the server(s) in response to the polling. Polling may occur at set intervals, e.g., every 30 minutes after an initial pack operation was performed. Accordingly, frequently changing aeronautical content may be mostly or always up-to-date, without requiring user intervention. Polling may be performed while the application is open, or in the background. The updating may be performed for a selected route or for any route that is stored on the EFB device. The updating may be performed for a limited time, e.g., for 24 hours after a route has been established or edited, or continuously until the route is removed from the EFB or changed, or until the updating is manually deactivated. Downloads may be suspended when disk space is low.

Turning to FIG. 3, a method for determining a buffer zone, in accordance with one or more embodiments of the invention, is shown.

Figure 4A:
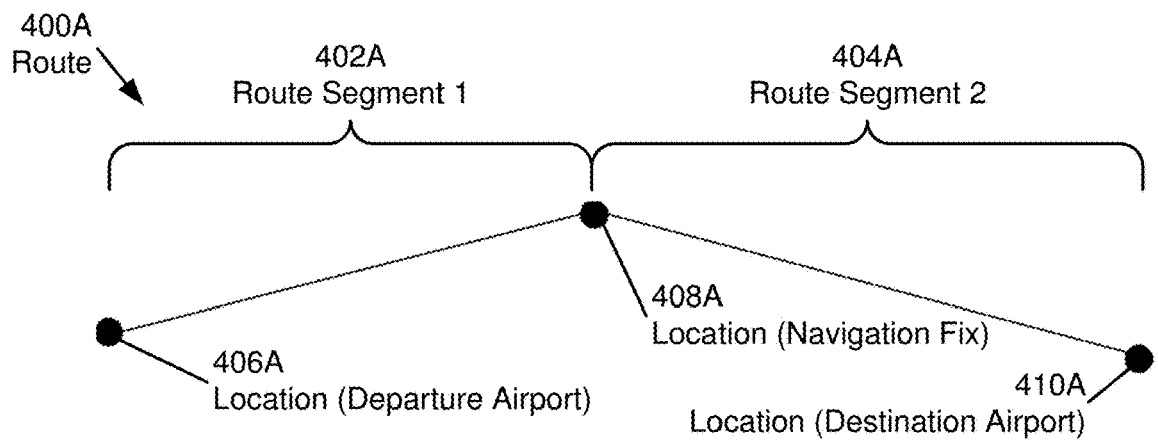
FIGS. 4A, 4B, 4C, 4D and 4E show an example for determining a buffer zone for a route, in accordance with one or more embodiments of the invention.

In one or more embodiments of the invention, the buffer zone is used to provide a margin, ensuring that for deviations from the route, within certain limits, aeronautical content is still provided. The method for determining the buffer zone is subsequently described with reference to FIGS. 4A-4E, where the steps are illustrated. An example of a route is shown in FIG. 4A. The route includes three locations (406A, 408A, 410A). One location is the departure airport, one location is the destination airport, and an intermediate location is a navigation fix. The three locations are connected by two route segments (402A, 404A), forming the route (404A). A route segment maybe be straight or curved (e.g., in case of a great circle route).

Figure 4B:
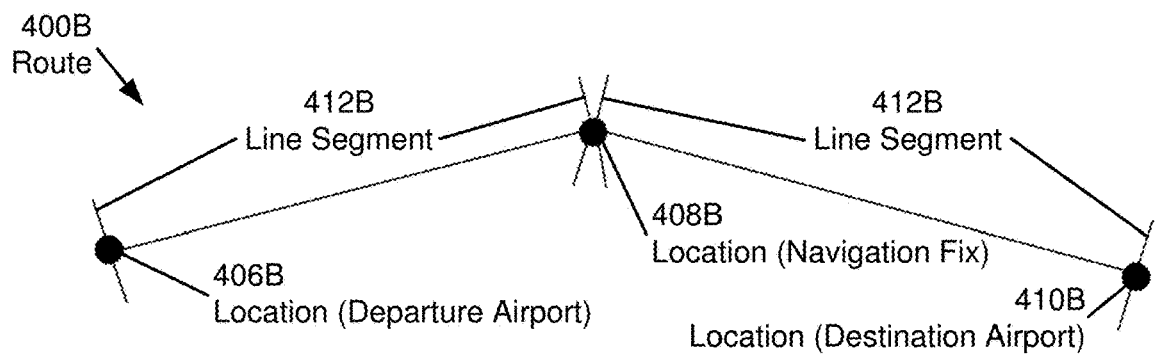

In Step 300 of FIG. 3, at each location of the route, a buffer radius is defined using line segments perpendicular to the corresponding route segment. The use of line segments to establish a buffer radius is illustrated in FIG. 4B. The line segments (412B) are placed at each of the locations (406B, 408B, 410B), perpendicular to the route segment at the location. The line segments, in one embodiment of the invention, have a length that defines the width of the buffer zone to be established. The line segment may extend, for example, 25 nautical miles (or any other distance) from the route.

Figure 4C:
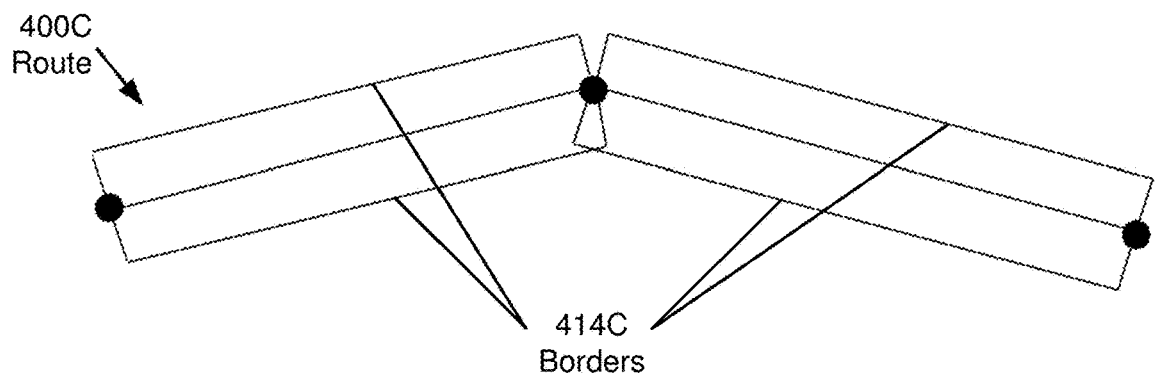

In Step 302, for each route segment, the endpoints of the line segments are connected to establish borders paralleling the route segment. Step 302 is illustrated in FIG. 4C, showing the borders (414C).

Figure 4D:
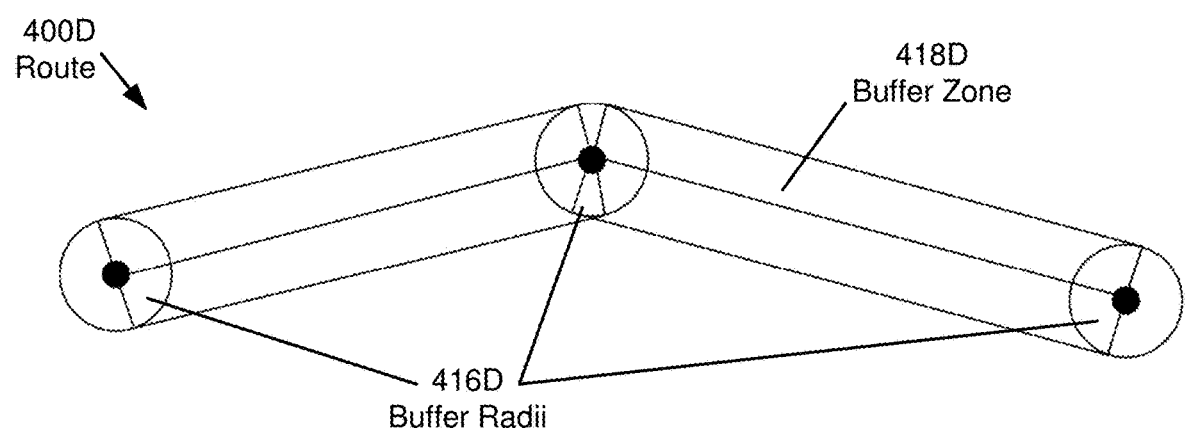
Figure 4E:
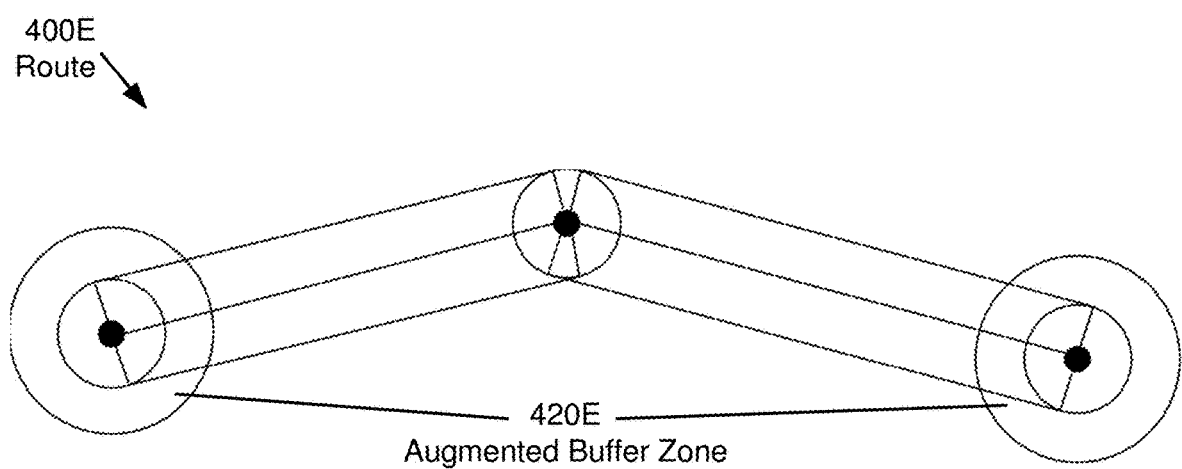

In Step 304, the borders of adjacent route segments are connected using a buffer radius. Step 304 is illustrated in FIG. 4D, showing buffer radii (416D) for each route segment, thus establishing a buffer zone (418D) surrounding the route (400D). The buffer zone may surround or enclose the route, providing a constant buffer of, for example, 25 miles at any point on the route.

In Step 306, the buffer zone is augmented at departure and destination locations (or at any other location on the route, if desired). The augmentation may be performed by adding a circular region to the buffer zone, at the desired location. In the example of FIG. 4D, the augmented buffer zone (420) includes two circular regions with a, for example, 50 nautical mile radius at the endpoints of the route (400E). The elements obtained in Steps 300-306 may form a closed contour that encloses the route, as illustrated in the example of FIG. 5B.

Those skilled in the art will appreciate that while the above description is for a two-dimensional route, the method may also be performed for a three-dimensional route, including altitudes along the route. Further, a time component may be considered along the route to select the appropriate aeronautical content for download. In addition, a route may also include alternate airports. An alternate airport may become the destination airport under certain conditions such as adverse weather, mechanical issues, emergencies, etc. Accordingly, the aeronautical content to be downloaded may also be based on alternate airports.

While the flowcharts of FIGS. 2A, 2B, and 3 discuss aspects of downloading aeronautical content, methods for removing unnecessary aeronautical content from the EFB device may also be implemented. For example, the EFB device may monitor the remaining storage capacity. Once the available storage capacity drops below a set threshold, a notification may be provided to the user. In a download management view, the user may then choose to remove expired aeronautical content or all aeronautical content. Once the content is removed, sufficient storage capacity may be available for the packing of additional routes.

Figure 5A:
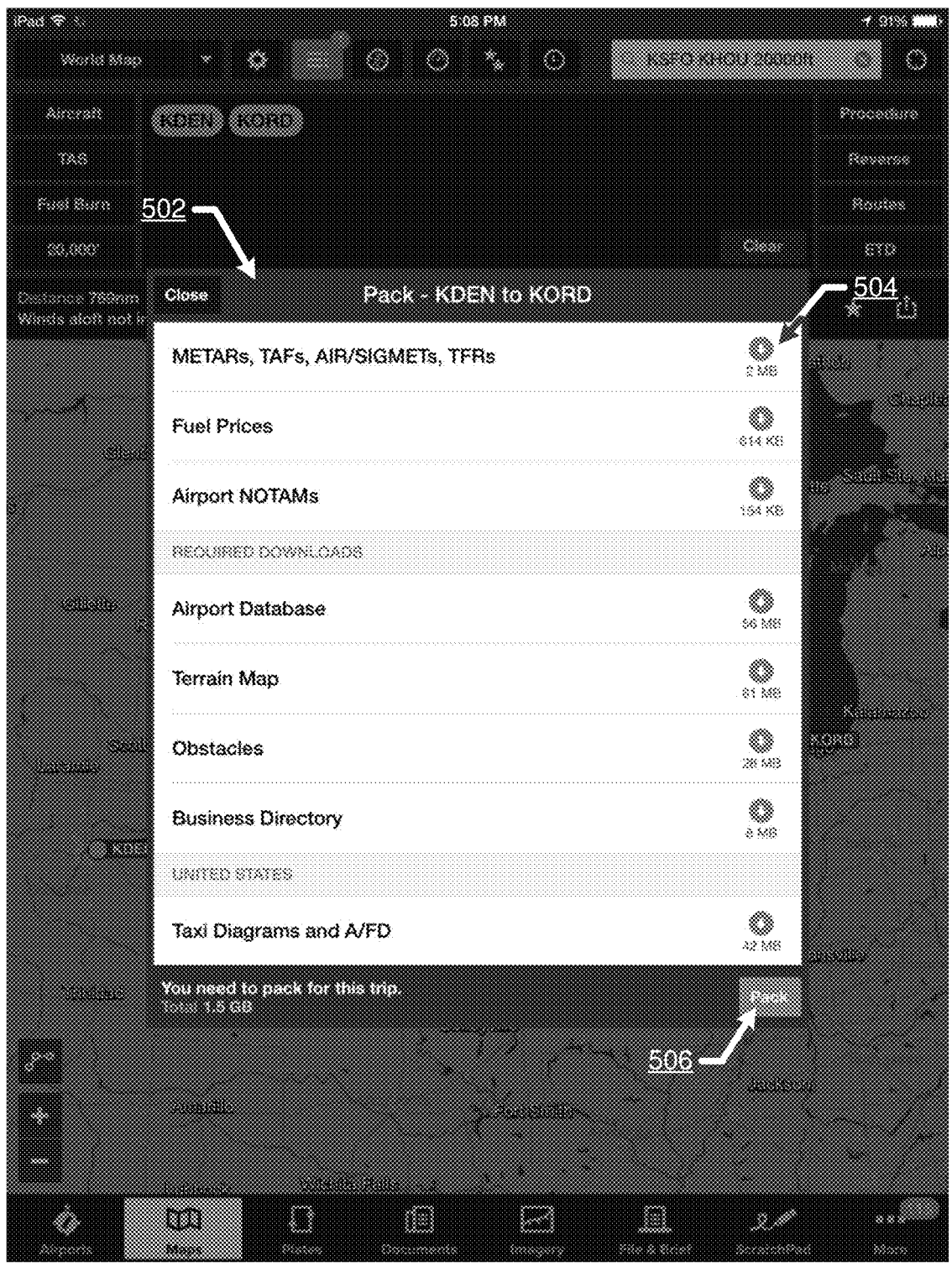
FIGS. 5A and 5B show examples of EFB packing scenarios, in accordance with one or more embodiments of the invention.
Figure 5B:
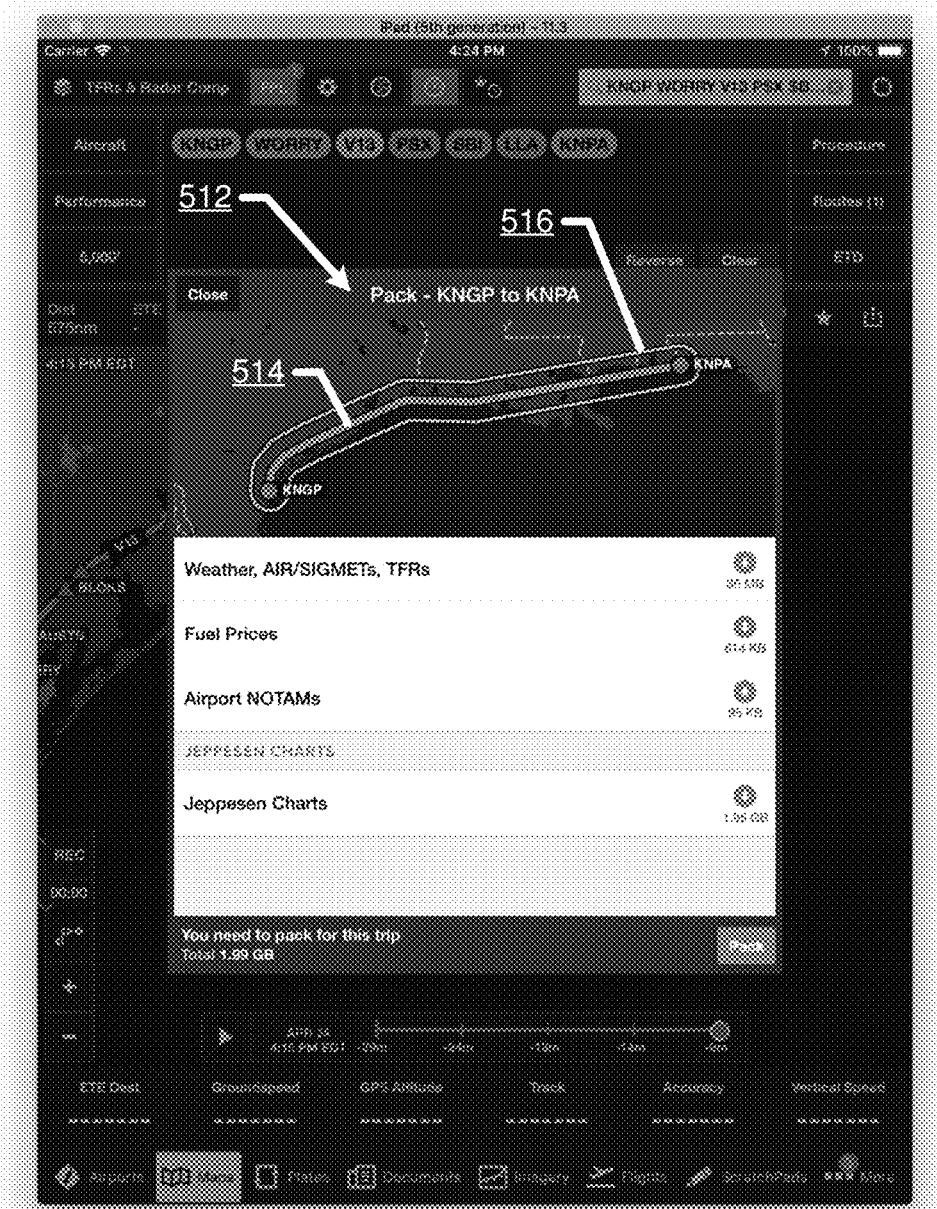

Turning to FIG. 5A, an example EFB packing scenario (500) is shown. Specifically, a user interface output of a route packing task for a route from the departure airport KDEN (Denver) to the destination airport KORD (Chicago) is shown. Various types of aeronautical content have been identified for download. Each type of aeronautical content is shown as a separate line item in popup window (502). A line item may be individually downloaded by clicking an associated download button (504), or the entire set of line items may be downloaded by clicking a pack button (506). After completion of the download, a pack indicator (e.g., an icon) may change from "packing needed" to "packing complete".

Turning to FIG. 5B, an example EFB packing scenario (510) is shown with window (512). Here, a route (514), displayed in the background, was modified, thus necessitating repacking. The display of the map includes labels for departure and destination airports, shows the buffer zone (516), and allows the user to zoom and pan to examine details, e.g., using touch gestures. Initially, the display may be arranged with the route in the center, and zoomed such that the entire route is visible. The route (514) may be shown using line segments connecting the locations of the route, and the buffer zone (516) may be indicated using a contour surrounding the route. Additionally or alternatively, the buffer zone (516) may be indicated using shading. In the shown example, the updated route was evaluated, and as a result, additional required aeronautical content is displayed to the user. All aeronautical content may be selected for download, or individual line items may be selected for download by the user as described above with reference to FIG. 5B.

Another EFB packing scenario addresses the automatic updating of packed routes. In the scenario, a list of stored routes is displayed to the user. Each displayed route, identified, for example, by a descriptive string, may be associated with a checkbox that enables automatic packing of the route. The user may, thus select or deselect the automatic packing. If selected, the packing may be performed as described with reference to FIG. 2A, and/or a re-packing may be performed as described in FIG. 2B, i.e., a re-packing may be performed when new data is available for download. When new data is found to be available, a packing analysis as described in FIG. 2A may be performed for all routes for which the automatic packing is enabled to detect whether any of the new data apply to these routes. The new data may then be associated with these routes. The new data may be automatically downloaded when a network connection is available. By default, the automatic packing may be selected. Pack indicators (e.g., icons) may indicate the status of each route. The pack indicator may show that packing is required for a route or that the pack is up-to-date. A user may also delete a route, e.g., by swiping the route. The deletion of the route may also discontinue the automatic packing for that route.

Various embodiments of the invention may have one or more of the following advantages. Embodiments of the invention enable a fully or partially automated packing of an electronic flight bag (EFB) for one or more routes in the EFB. Embodiments of the inventions, thus, may ensure that all required or desired aeronautical content is correctly downloaded to the EFB device, prior to a flight. Because the download is performed selectively, thus avoiding the download of unnecessary aeronautical content, the limited storage capacity of an EFB device may be optimally used. Embodiments of the invention may reduce the workload of a flight crew and may reduce or eliminate mistakes resulting from an erroneous manual selection of aeronautical content, and thus, also may enhance flight safety.

Embodiments of the invention may be implemented on a computing system. Any combination of mobile, desktop, server, router, switch, embedded device, or other types of hardware may be used. For example, as shown in FIG. 6.A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 6A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the invention.

While the disclosed technology has been described with respect to a limited number of embodiments, those skilled in the art, having benefit of this disclosed technology, will appreciate that other embodiments can be devised which do not depart from the scope of the disclosed technology as disclosed herein. Accordingly, the scope of the disclosed technology should be limited only by the attached claims.

What is claimed is:

1. A method for packing an electronic flight bag (EFB), the method comprising:
   obtaining a route;
   determining a buffer zone surrounding the route, the buffer zone establishing an area that extends a defined distance perpendicular to the route,
      wherein the buffer zone distinguishes aeronautical content to be automatically included in the EFB from aeronautical content not to be automatically included in the EFB;
   identifying the aeronautical content to be downloaded based on being at least partially located in the buffer zone;
   downloading the identified aeronautical content from a remote aeronautical content repository to the EFB, wherein the remote aeronautical content repository is remote to a device hosting the EFB;
   selecting, from the downloaded aeronautical content, at least one aeronautical chart; and
   displaying the route and the buffer zone in the at least one aeronautical chart.

2. The method of claim 1 further comprising, prior to downloading the identified aeronautical content:
   removing, from the aeronautical content to be downloaded, aeronautical content that was previously downloaded.

3. The method of claim 1 further comprising:
   downloading updated identified aeronautical content to the EFB when the identified aeronautical content in the remote aeronautical content repository changes.

4. The method of claim 3 further comprising:
   associating the downloaded updated identified aeronautical content with routes in the EFB for which an automatic packing is activated.

5. The method of claim 1 further comprising:
   receiving, from a user, edits to the route, resulting in an updated route;
   determining an updated buffer zone surrounding the updated route;
   identifying updated aeronautical content that is at least partially located in the updated buffer zone; and
   downloading the identified updated aeronautical content from the remote aeronautical content repository to the EFB.

6. The method of claim 1, wherein the identified aeronautical content comprises at least one selected from a group consisting of:
   charts,
   weather information,
   airport information, and
   notices to airmen (NOTAMs).

7. The method of claim 1, wherein determining the buffer zone comprises:
   establishing border segments paralleling the route, between locations of the route;
   connecting adjacent border segments using a buffer radius;
   augmenting the buffer zone by circular regions at the departure and destination airports of the route; and
   forming a closed contour, enclosing the route, by the border segments, the buffer radius, and the circular regions.

8. The method of claim 7, wherein displaying the route and the buffer zone in the at least one aeronautical chart comprises:
   displaying a region of the at least one aeronautical chart, wherein the region comprises the route; and
   overlaying line segments indicating the route; and
   overlaying the closed contour delimiting the buffer zone.

9. The method of claim 1, wherein determining the buffer zone comprises establishing a border paralleling an altitude profile of the route.

10. The method of claim 1, wherein the buffer zone is temporally delimited based on an anticipated progression of a flight using the route.

11. A system for packing an electronic flight bag (EFB), the system comprising:
a route repository;
a local aeronautical content repository;
a display; and
an EFB packing engine configured to:
obtain a route from the route repository;
determine a buffer zone surrounding the route;
identify aeronautical content to be downloaded that is at least partially located in the buffer zone;
download the identified aeronautical content from a remote aeronautical content repository to the local aeronautical content repository of the EFB, wherein the remote aeronautical content repository is remote to the system;
selecting, from the downloaded aeronautical content, at least one aeronautical chart;
displaying, in the display, the route and the buffer zone in the at least one aeronautical chart;
displaying a list of routes; and
displaying, for each of the routes in the list of routes, a checkbox activating automatic packing of the route.

12. The system of claim 11, wherein the display is further configured to:
display, for each of at least a subset of the routes in the list of routes, a packing indicator providing the packing status of the route, wherein the packing indicator indicates that a packing for the route is required or that the packing for the route is up-to-date.

13. The system of claim 11, wherein the EFB packing engine is further configured to download updated identified aeronautical content to the EFB when the identified aeronautical content in the remote aeronautical content repository changes.

14. The system of claim 13, wherein the EFB packing engine is further configured to associate the downloaded updated identified aeronautical content with routes in the EFB for which an automatic packing is activated.

15. A non-transitory computer readable medium comprising computer readable program code for causing a computer system to:
obtain a route;
determine a buffer zone surrounding the route, the buffer zone establishing an area that extends a defined distance perpendicular to the route,
wherein the buffer zone distinguishes aeronautical content to be automatically included in an electronic flight bag (EFB) from aeronautical content not to be automatically included in the EFB;
identify the aeronautical content to be downloaded that is at least partially located in the buffer zone;
download the identified aeronautical content from a remote aeronautical content repository to an electronic flight bag (EFB) hosted on the computer system, wherein the remote aeronautical content repository is remote to the computer system;
select, from the downloaded aeronautical content, at least one aeronautical chart; and
display the route and the buffer zone in the at least one aeronautical chart while the remote content repository is unreachable by the computer system.

16. The non-transitory computer readable medium of claim 15, wherein the computer readable program code further causes the computer system to:
download updated identified aeronautical content to the EFB when the identified aeronautical content in the remote aeronautical content repository changes; and
associate the downloaded updated identified aeronautical content with routes in the EFB for which an automatic packing is activated.

17. The non-transitory computer readable medium of claim 15, wherein the computer readable program code further causes the computer system to:
receive, from a user, edits to the route, resulting in an updated route;
determine an updated buffer zone surrounding the updated route;
identify updated aeronautical content that is at least partially located in the updated buffer zone; and
download the identified updated aeronautical content from the remote aeronautical content repository to the EFB.

18. The non-transitory computer readable medium of claim 15 wherein the computer readable program code further causes the computer system to:
establish border segments paralleling the route, between locations of the route;
connect adjacent border segments using a buffer radius;
augment the buffer zone by circular regions at the departure and destination airports of the route; and
form a closed contour, enclosing the route, by the border segments, the buffer radius, and the circular regions.

19. The non-transitory computer readable medium of claim 18, wherein the computer readable program code further causes the computer system to:
display a region of the at least one aeronautical chart, wherein the region comprises the route; and
overlay line segments indicating the route; and
overlay the closed contour delimiting the buffer zone.

20. The system of claim 11 wherein the EFB packing engine is configured to further to:
receive, from a user, edits to the route, resulting in an updated route;
determine an updated buffer zone surrounding the updated route;
identify updated aeronautical content that is at least partially located in the updated buffer zone; and
download the identified updated aeronautical content from the remote aeronautical content repository to the EFB.

* * * * *